United States Patent [19]

Musella et al.

[11] Patent Number: 4,955,798

[45] Date of Patent: Sep. 11, 1990

[54] PROCESS FOR PRETREATING METAL IN PREPARATION FOR COMPACTING OPERATIONS

[75] Inventors: Vincenzo Musella; Mario D'Angelo, both of Arzano, Italy

[73] Assignee: Nuova Merisinter S.P.A., Italy

[21] Appl. No.: 413,376

[22] Filed: Sep. 27, 1989

[30] Foreign Application Priority Data

Oct. 28, 1988 [IT] Italy ................... 48510 A/88

[51] Int. Cl.⁵ .............................................. B22F 1/00
[52] U.S. Cl. ........................................ 419/31; 419/32; 419/36; 75/231
[58] Field of Search ................... 419/6, 10, 54, 36, 32, 419/31, 44; 75/231

[56] References Cited

U.S. PATENT DOCUMENTS

| | | | |
|---|---|---|---|
| 2,717,419 | 9/1955 | Dickey | 419/36 |
| 3,351,464 | 11/1967 | Budincsevits | 419/36 |
| 3,410,684 | 11/1968 | Printz | 419/36 |
| 4,721,599 | 1/1988 | Nakamura | 419/23 |
| 4,737,332 | 4/1988 | Miyashita et al. | 264/233 |
| 4,765,950 | 8/1988 | Johnson | 419/2 |

FOREIGN PATENT DOCUMENTS 0029389 11/1979 European Pat. Off.
2643954 9/1976 Fed. Rep. of Germany.

Primary Examiner—Brooks H. Hunt
Assistant Examiner—Ngoclan T. Mai
Attorney, Agent, or Firm—Roylance, Abrams Berdo & Goodman

[57] ABSTRACT

A pretreating process in powder metallurgy for preparing powders for compacting or densifying operations includes the steps of mixing powder metals with solid lubricants and optionally with liquid solvents to form a mixture and heating the resulted mixture prior to compacting or densifying to a temperature greater than room temperature and below the softening temperature of the solid lubricants.

10 Claims, 3 Drawing Sheets

PROCESS FOR PRETREATING METAL IN PREPARATION FOR COMPACTING OPERATIONS

BACKGROUND OF THE INVENTION

1. Field of the Invention

This invention relates to the general field of powder metallurgy and it is particularly concerned with a preliminary treatment of powders to be employed for compacting operations in order to improve on the quality of the articles so obtained.

2. Description of the Related Art

As is well known, the usual powder metallurgy practice employs raw materials in the form of powders suitably prepared, compacting such material by means of one of the various processes normally employed and then treating the product so obtained adopting suitable conditions of temperature, pressure and composition of the environmental atmosphere in order to obtain a product of desired physicochemical and technological characteristics.

It is well known to those who are skilled in the art that the final characteristics obtained remarkably depend on the density increase obtained by means of the forming operation. Because of that reason, many processes have been introduced into the industrial practice both for improving on the capability of raw materials of undergoing increase in density, and for obtaining improvements through the addition of some agents to the mixtures employed.

It is common practice to add to the mixtures of powders to be compacted some compounds that substantially are not necessary for obtaining the final product, but capable of giving some lubricating effect so as to reduce the forces necessary to give the desired density increase. Lubricants commonly employed are of various types: among the most widespread lubricants, lithium stearates, zinc stearates as well the stearates of other metals, paraffins, waxes, natural or synthetic fat derivatives are employed. Such lubricants are added to raw materials in amounts from 0.2 up to 10% by weight, according to various compacting or densifying techniques and according to the various final properties desired for the products obtained.

Powders so prepared are then subjected at room temperature to the selected forming process. Among the most widespread forming systems, the technique of compacting in press molds, extrusion, the employment of injection molds, and rolling can be mentioned. In all such cases, a certain pressure is exerted on the mixed powder, which as a consequence becomes denser but opposes to the pressure "P" a reaction force that increases almost exponentially with increasing the density and can be determined by the ratio "R" between the apparent density of the compacted powder and the theoretical density of the material employed.

The strong pressure exerted gives rise to remarkable frictional forces among the particles of the powder, as well as between the powder and the walls of the molds and of the forming equipment. Thus, some practical difficulties arise in compacting powder beyond a given limit, together with the difficulty of extracting the compacted powder out of molds because of the strong frictional forces with the walls, tendency to wear or to breaking of equipment, need for employing high quality powders which are much more expensive practical impossibility of producing articles of complicated shapes, and need for machines of higher power.

A process according to the usual technique for reducing such difficulties consists in employing powders heated up to 350°–650° C. in a non-oxidizing controlled atmosphere and poured into a mold containing a lubricant and previously heated up to 150°–450° C. for compacting said powders. However, such process is limited by the requirement of heating the powder up to a relatively high temperature and of employing a non-oxidizing atmosphere, as well as by the requirement of treating unlubricated powders and by the requirement of preliminarily heating the mold and of lubricating the same, in addition to the need for controlling the atmosphere around the mold.

SUMMARY OF THE INVENTION

The object of the present invention is to provide a process that allows:

high temperatures for treating powders to be avoided;

the employment of non-oxidizing, controlled atmospheres in the preparation of powders to be avoided;

the employment of controlled atmospheres around the mold and other compacting equipment to be avoided;

the previous heating of molds and other compacting equipment to be avoided;

the direct lubrication of molds and other compacting equipment to be avoided;

forces required to compact powders to be lowered;

forces exerted for extracting the compacted powders out the molds to the reduced;

the density level practically obtainable to be increased;

wear of molds and other forming equipment to be reduced;

lower quality powders to be employed;

more complex shapes to be realized;

less powerful machines to be employed.

The foregoing objects are basically attained by a process for pretreating metallurgical powders to be compacted or densified by mixing the metallurgical powders with a solid lubricant and heating the mixture to a temperature between room temperature and the softening temperature of the solid lubricant. A liquid solvent may also be added to the mixture. A non-oxidizing controlled atmosphere is not necessary and the pre-heating may occur with even an oxidizing atmosphere, or in the presence of air.

Again according to the preferred embodiment of the invention, pre-heating occurs at a temperature between 70° and 120° C.

Further details and advantages of the present invention will be evident as the present disclosure will be further considered with reference to the enclosed drawings wherein:

DETAILED DESCRIPTION OF THE INVENTION

As already mentioned above, the process of the present invention employs powders prepared by the addition of solid lubricants with or without a liquid additive. Solid lubricating additives are just those suggested by the common practice. The liquid additive consists of a paraffinic organic solvent. The preferred liquid as regards the present invention is lamp oil. The amounts of liquid solvent added to the powders for preparing the same can vary from 0 to 200 g/tonne of powder. The amounts of the solid lubricating agents can vary from 0.2 to 10% by weight in the whole mixture. The powders and the agents added to the same are well mixed for a time sufficient to allow the powder particles and the lubricating additives to come in intimate contact. Thus the particles will be coated by a thin film of the lubricating agent, especially as a result of the liquid solvent action if the same is present.

Such powders, after the mixing operations mentioned above and before undergoing the compacting operation, are heated up to a temperature different from room temperature, anyway up to temperatures lower than the softening point of the lubricant.

For the lubricating agents mentioned above, such limit temperature is normally of 150° C., and the preferred values of temperature are within the range from 70° to 120° C. As powders are protected by the lubricating film and as temperature is relatively low, such heating can be carried out even in the presence of an oxidizing atmosphere, for instance in the presence of air.

Thus a not previously heated mold which is not protected by a controlled, non-oxidizing atmosphere can also be employed. Moreover, the presence of a lubricating agent spread throughout the whole mass of powders allows the use of molds not previously lubricated.

Preliminary heating of the mixed powder allows the best lubrication conditions to be reached already in the first compacting steps, through the drastic reduction of frictional forces among the powder particles as well as between the powder and the walls. The lubricant, being more fluid, will show an increased tendency to flow from the pores towards the outside of the article so making it easier to compact the powder itself and lubricating better and more abundantly the contact surfaces between the powder and the walls of the mold or of the compacting equipment.

Figure 1:
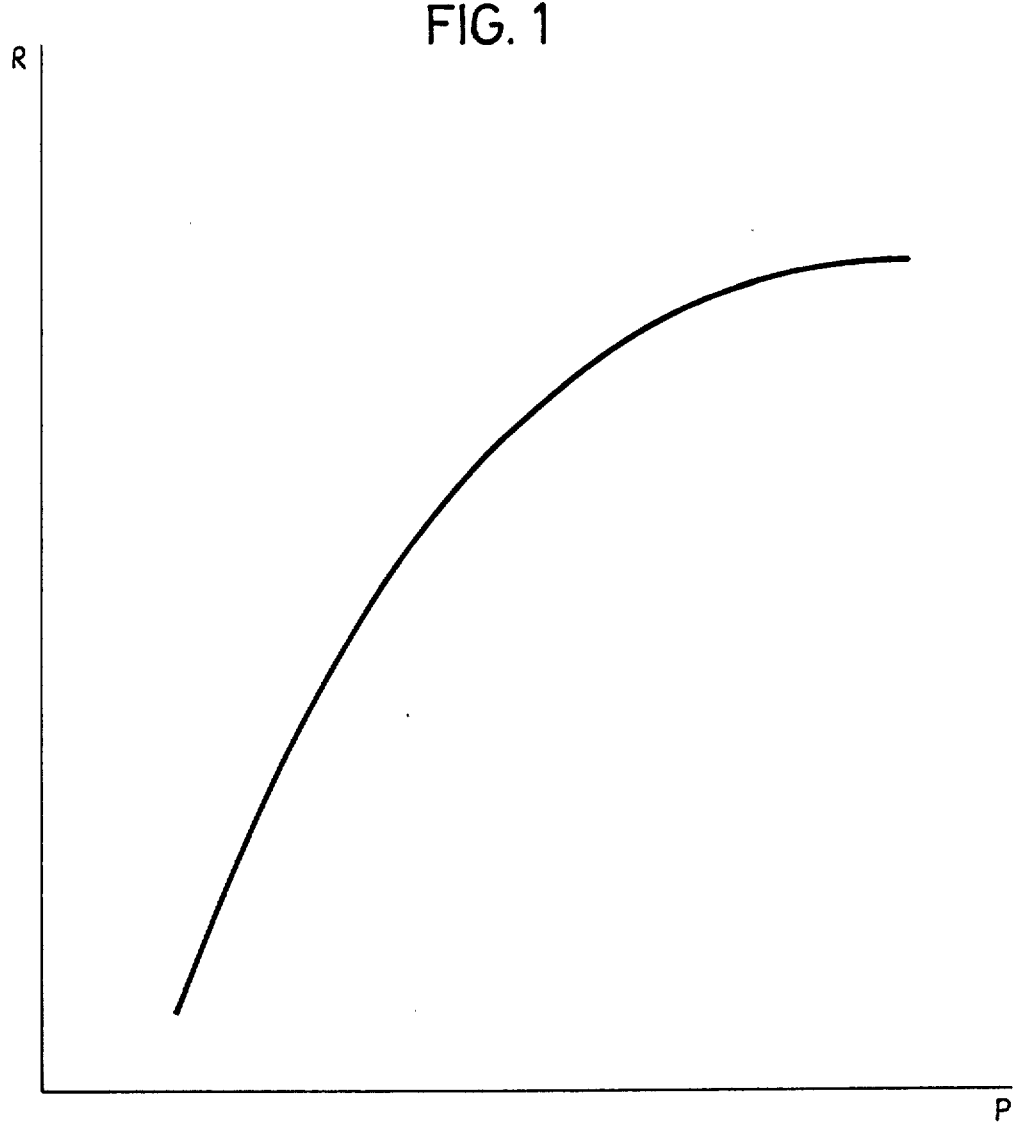
FIG. 1 shows a typical plot of pressure P required for obtaining the desired density increase R as a function of said degree of thickening.
Figure 2:
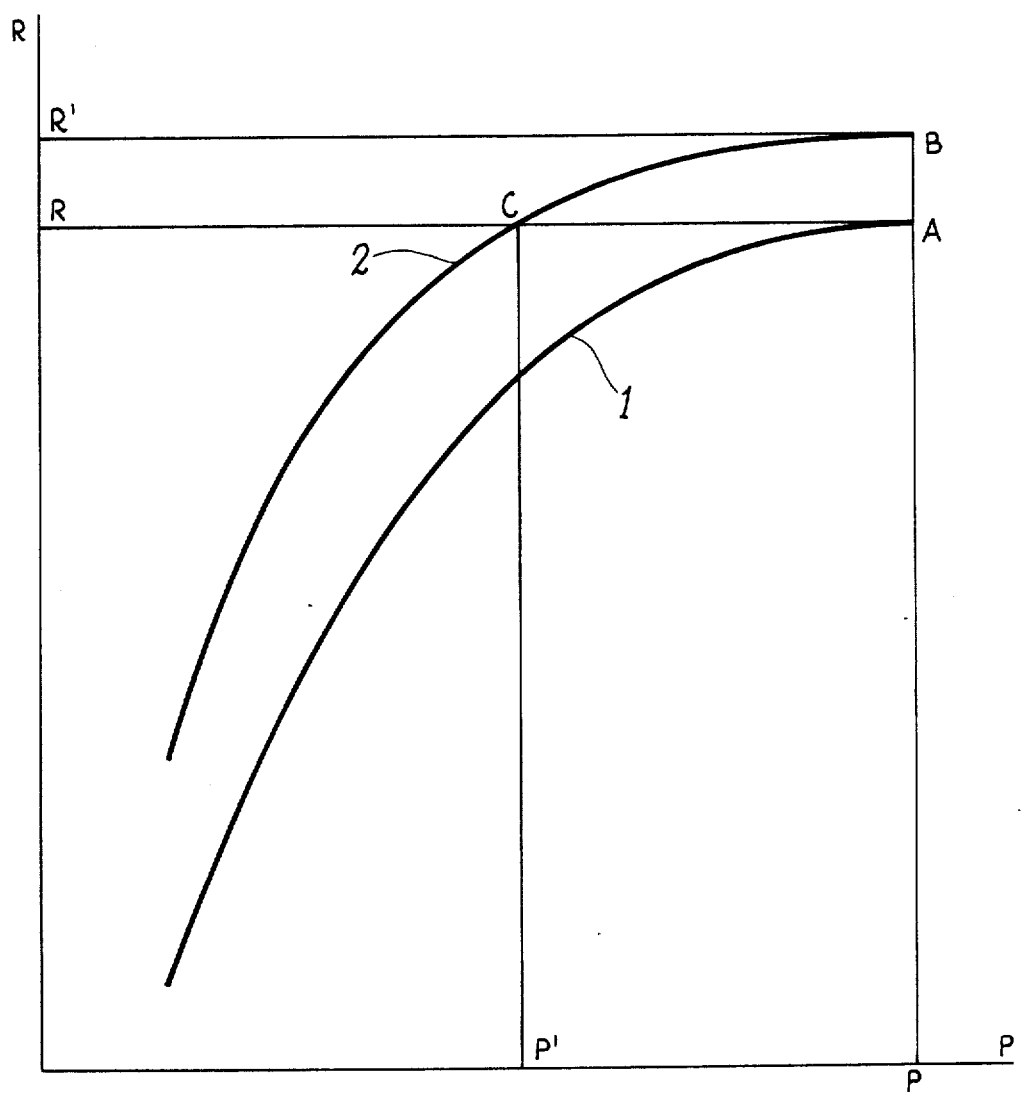
FIG. 2 shows for exemplification purposes a typical behavior of R-P curves obtained by applying the present invention.

FIG. 2 shows just for exemplification purposes a typical result of the application of the present invention. Curve 1 shows the behavior of the compacting pressure with respect to the increase in density obtained in the case of a powder mixed with 0.5% by weight of a lubricant, and employed at room temperature. Curve 2 shows such behavior in the case for the same powder but employed after heating it up to a temperature in the preferred range.

FIG. 2 shows that if pressure P is required to obtain a given density increase R employing the powder at room temperature (point A of curve 1), it is possible to obtain a degree of thickening R' larger than R with the same pressure P (point B of curve 2) or to obtain the same density increase R but with pressure P' lower than pressure P (point C of curve 2) employing a powder preliminarily heated according to the present invention.

Figure 3:
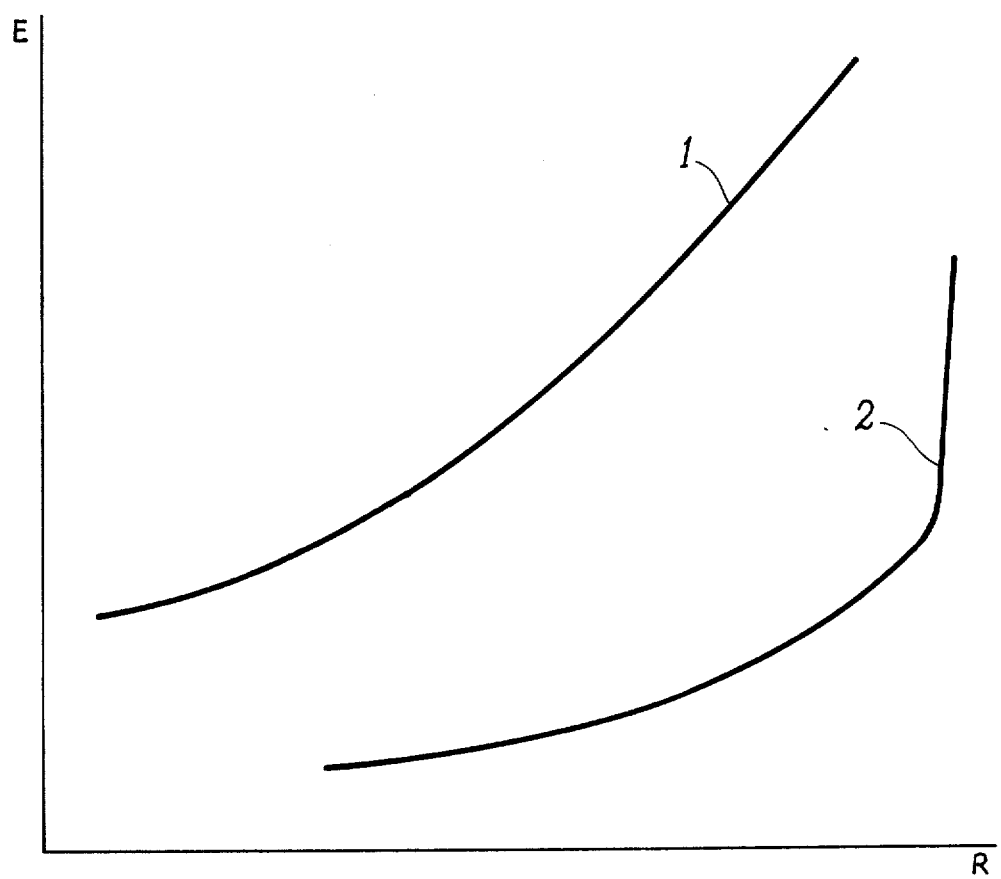
FIG. 3 illustrates a plot that exemplifies the extraction forces E as a function of the density increase R for powders at room temperature (curve 1) and for previously heated powders (curve 2).

Similar improved results are obtained if the values of the forces required to extract the compacted or densified powders out of the molds are compared. FIG. 3 shows a plot that exemplifies the extraction forces E as a function of the density increase R in the case of powders treated at room temperature (curve 1) and in the case of powders preliminarily heated (curve 2).

In the preceding disclosure, the preferred embodiment of the invention has been illustrated, but it is to be understood that modifications and/or changes can be introduced in the same by those who are skilled in the art without departing from the spirit and scope of the invention as defined in the following claims.

We claim:

1. A process for pretreating metallurgical powders in preparation for compacting or densifying comprising the steps of mixing said metallurgical powders with a solid lubricant to form a mixture heating said mixture prior to compacting or densifying to a temperature above room temperature and below the softening temperature of the solid lubricant.

2. The process according to claim 1, further including the step of mixing a liquid solvent with said mixture before the heating step.

3. The process according to claim 1, wherein said heating step occurs in the absence of a nonoxidizing atmosphere.

4. The process according to claim 1, wherein said heating step occurs in the presence of ambient air.

5. The process according to claim 1, wherein said solid lubricant has a softening temperature above 120° C. and said heating step is to a temperature above 70° C. and below 120° C.

6. The process according to claim 1, wherein said solid lubricant is a member selected from the group of lithium, zinc and other metal stearates, paraffins, waxes, natural or synthetic fat derivatives.

7. The process according to claim 2, wherein said liquid solvent is a paraffinic organic solvent.

8. The process according to claim 2, wherein said liquid solvent is lamp oil.

9. The process according to claim 1, wherein said solid lubricant is in an amount of between about 0.2 and 10% by weight of said mixture.

10. The process according to claim 2, wherein said liquid solvent is in an amount of between about 0 and 200 grams per ton of powder.

* * * * *

REEXAMINATION CERTIFICATE (3755th)
United States Patent [19]
Musella et al.

[11] B1 4,955,798
[45] Certificate Issued Mar. 30, 1999

[54] PROCESS FOR PRETREATING METAL POWDER IN PREPARATION FOR COMPACTING OPERATIONS

[75] Inventors: Vincenzo Musella; Mario D'Angelo, both of Arzano, Italy

[73] Assignee: Nuova Merisinter S.p.A., Arzano, Italy

Reexamination Request:
No. 90/004,003, Oct. 30, 1995

Reexamination Certificate for:
Patent No.: 4,955,798
Issued: Sep. 11, 1990
Appl. No.: 413,376
Filed: Sep. 27, 1989

[30] Foreign Application Priority Data

Oct. 28, 1988 [IT] Italy ........................ 48510/88

[51] Int. Cl.$^6$ .................................... B22F 1/00
[52] U.S. Cl. .................... 419/31; 419/32; 419/37; 419/65; 75/231
[58] Field of Search .................... 419/31, 36, 37, 419/65, 32; 75/231

[56] References Cited

U.S. PATENT DOCUMENTS 4,737,332  4/1988  Miyashita et al. ............... 264/233

4,955,798  9/1990  Musella et al. .................. 419/31

FOREIGN PATENT DOCUMENTS 0 375 627 B1  9/1989  European Pat. Off.

OTHER PUBLICATIONS

D. Yarnton & T.J. Davies, Powder Technology—Effect of Lubricant on the Flow and Packing Density of Copper Powder, 1970 *Engineering Materials and Design*.

D. Yarnton & T.J. Davies, The Effect of Lubricant Content on the Packing of Metal Powders, 1962 *Mettalurgia*.

A. Taskinen, H. Tonteri, and L. Holoppaa, Research Project n:o 2504/82, Powder Flow Properties And Conditioning Agents, 1983 *Jernkonmtorets Forskning Hoganas Iron Powder Handbook, vol. 1: Basic information* (1957).

*Primary Examiner*—Ngoclan Mai

[57] ABSTRACT

A pretreating process in powder metallurgy for preparing powders for compacting or densifying operations includes the steps of mixing powder metals with solid lubricants and optionally with liquid solvents to form a mixture and heating the resulted mixture prior to compacting or densifying to a temperature greater than room temperature and below the softening temperature of the solid lubricants.

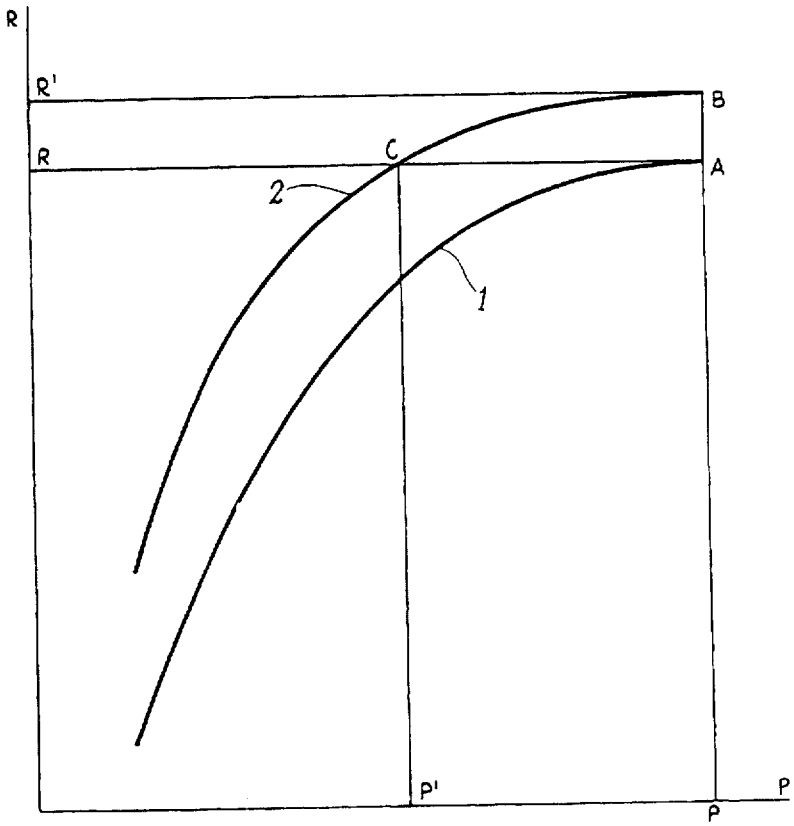

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2–10, dependent on an amended claim, are determined to be patentable.

1. A process [for] *comprising*
   (a) pretreating metallurgical powders in preparation for compacting or densifying comprising the steps of
   mixing said metallurgical powders with a solid lubricant to form a mixture
   heating said mixture prior to compacting or densifying to a temperature above room temperature and below the softening temperature of the solid lubricant[.]*;* *and*
   (b) *thereafter compacting or densifying said pretreated metallurgical powders in a mold and extracting the compacted or densified powders out of the mold.*

* * * * *